(12) United States Patent
Sun et al.

(10) Patent No.: US 12,508,324 B2
(45) Date of Patent: *Dec. 30, 2025

(54) AMPHIPHILIC ALGINATE-OLEIC ACID MACROMOLECULES AND PROCESS FOR PREPARATION THEREOF

(71) Applicant: Nuecology Biomedical Inc., Richmond (CA)

(72) Inventors: Chung Chin Sun, Richmond (CA); Dean Mo Liu, Surrey (CA)

(73) Assignee: NUECOLOGY BIOMEDICAL INC., Richmond (CA)

( * ) Notice: Subject to any disclaimer, the term of this patent is extended or adjusted under 35 U.S.C. 154(b) by 690 days.

This patent is subject to a terminal disclaimer.

(21) Appl. No.: 17/909,709

(22) PCT Filed: Mar. 5, 2021

(86) PCT No.: PCT/CA2021/050293
§ 371 (c)(1),
(2) Date: Sep. 6, 2022

(87) PCT Pub. No.: WO2021/174365
PCT Pub. Date: Sep. 10, 2021

(65) Prior Publication Data
US 2023/0122200 A1    Apr. 20, 2023

(30) Foreign Application Priority Data

Mar. 5, 2020 (WO) ................ PCT/CA2020/050297

(51) Int. Cl.
| | |
|---|---|
| C08L 5/04 | (2006.01) |
| A61K 9/19 | (2006.01) |
| A61K 31/12 | (2006.01) |
| A61K 47/54 | (2017.01) |
| A61K 47/69 | (2017.01) |
| A61P 35/00 | (2006.01) |

(52) U.S. Cl.
CPC .......... *A61K 47/6939* (2017.08); *A61K 31/12* (2013.01); *A61K 47/542* (2017.08); *A61P 35/00* (2018.01)

(58) Field of Classification Search
None
See application file for complete search history.

(56) References Cited

U.S. PATENT DOCUMENTS

| 12,239,703 B2 * | 3/2025 | Sun ..................... A61P 31/14 |
| 2019/0209502 A1 * | 7/2019 | Friend .................. A61K 31/19 |

FOREIGN PATENT DOCUMENTS

| JP | 2010209130 A * | 9/2010 | |
| WO | WO-2011084705 A2 * | 7/2011 | ............. A61K 39/00 |

OTHER PUBLICATIONS

Shirmard et al., (Feb. 6, 2020) Improving the in-vivo biological activity of fingolimod loaded PHBV nanoparticles by using hydrophobically modified alginate, Drug Development and Industrial Pharmacy, 46:2, 318-328 (with publication date showing) (Year: 2020).*
Shirmard et al., (Feb. 6, 2020) Improving the in-vivo biological activity of fingolimod loaded PHBV nanoparticles by using hydrophobically modified alginate, Drug Development and Industrial Pharmacy, 46:2, 318-328 (Year: 2020).*
Raja et al., Nanoparticles based on Oleate Alginate Ester as Curcumin Delivery System, Curr Drug Deliv. 2015; 12(5):613-27 (Year: 2015).*
Severino et al., Alginate Nanoparticles for Drug Delivery and Targeting, Current Pharmaceutical Design, 2019, 25, 1312-1334 (Year: 2019).*
Wu et al., Colloids and Surfaces B: Biointerfaces 123 (2014) 498-505 (Year: 2014).*
Pandey et al., (2006) Chemotherapeutic Efficacy of Nanoparticle Encapsulated Antitubercular Drugs, Drug Delivery, 13:4, 287-294 (Year: 2006).*
MIT OpenCourseWare, 8.4—Extraction and Washing Guide 5.301 Chemistry Laboratory Techniques January IAP 2012 (Year: 2012).*
JP2010209130A_english translation (Year: 2010).*

* cited by examiner

*Primary Examiner* — Kortney L. Klinkel
*Assistant Examiner* — Alison Azar Salamatian
(74) *Attorney, Agent, or Firm* — Birch, Stewart, Kolasch & Birch, LLP

(57) ABSTRACT

The present invention provides a new type of hydrophobically-modified sodium alginate, which is synthesized by alginate and oleic acid linked with a spacer. The AGO macromolecule as obtained therefrom is amphiphilic and has clinically-accessible molecular size, and anti- cancer activity. The AGO nanoparticle formed therefrom shows excellent structural stability, colloidal stability, and biocompatibility in-vitro and in-vivo, and is expected to be useful in biomedical area, for example, used as a drug delivery system.

11 Claims, 8 Drawing Sheets

AMPHIPHILIC ALGINATE-OLEIC ACID MACROMOLECULES AND PROCESS FOR PREPARATION THEREOF

FIELD OF THE INVENTION

The present invention pertains to amphiphilic alginate-oleic acid macromolecules that can be used as a delivery system for an active agent, such a drug or a biological material.

BACKGROUND OF THE INVENTION

Nanoparticles are often proposed for use as a delivery system for a biological one or more biologically active materials or agents, such as a pharmaceutical, a biological substance or cells. Frequently, it has been challenging to incorporate (or "load") the biologically active agent into the nanoparticle because the amount that can be incorporated is limited or that it takes a great deal of time to incorporate the material (through, for example, diffusion). This challenge will limit the practical or commercial utility of the nanoparticle as a delivery mechanism for a biologically active agent.

Sodium alginate, a kind of biopolymer, is well known for its biocompatible, non-toxic and non-immunogenic properties, and has been FDA approved for certain clinical uses from wound dressing to injection. Alginates had been widely applied as medical material such as drug delivery, wound dressing, cell culture and tissue regeneration. Alginates are generally used as thickening, gel forming, and stabilizing agents in pharmaceutical applications. Oral dosage forms are the most frequent in currently pharmaceutical applications, and the use of alginates in targeted drug delivery is growing rapidly in recent years. There are several methods to employ alginates as drug vehicle such as gelation, in combination with chitosan, pro-drug and/or amphiphilic modification . Boontheekul at el., reported the release of flurbiprofen from ionically cross-linked, partially oxidized alginate gels in 1.5 h. By forming ionic complexes with chitosan, due to opposite charges, such alginate-chitosan complexes showed pH-dependent and a higher swelling degree and faster drug release were observed from the particulate systems in a simulated enteric environment (pH 7.5), as compared to a simulated gastric environment (pH 1.2). This special property of pH-dependent swelling makes it capable of passive targeting the gastrointestinal tract. [4] In an advanced version to achieve prolong release, researchers used the combination of ionic and covalent cross-linking (calcium ions and adipic acid dihydrazide) to increase the ratio of cross-linking and reduce swelling.

Alginates are used to modulate the release of hydrophobic substances, which becomes an attractive research objective and received large attention in recent decades, where amphiphilic modification along with the hydrophilic backbone of native alginates appears to be more interesting and challenging in the development of advanced biomaterials for nano-pharmaceutic applications.

Sodium alginate with controlled molecular weight in a range generally below 70 KDa has been reported to be capable of metabolizing by renal clearance in in-vivo studies. Besides, from a number of reports, numerous hydrophobic substances included ester groups, vinyl groups or heterocyclic compounds had frequently employed to chemically or covalently associate with fraction of hydroxyl groups or carboxyl groups along the alginate backbone, giving rise to amphiphilic nature of modified alginates. This allows self-assembly ability to be imparted in the modified alginates, and makes the modified alginates more applicable for drug encapsulation and controlled delivery for hydrophilic and/or hydrophobic drugs or a combination of both with enhanced therapeutic performance.

The commercial sodium alginate without any treatment such as hydrolysis and oxidation is not suitable to be a based material for synthesis of nanoparticle, due to both its high molecular weight (i.e., >600 kDa) and wide molecular weight distribution. Yang et al. reported a drug carrier (OAAD, Octyl-Grafted Amphiphilic Alginate-amide derivative) which was based on non-treatment sodium alginate. Its result shows a large and widely distribution of particle size (i.e., 0.8-10 µm). In order to metabolize the sodium alginate entering human body, the molecular weight must lower than the renal clearance threshold of the kidneys (i.e., <70 kDa). It is more important and interesting if additional bio-functionality such as controlled cytocompatibility, controlled degradation (by kidney metablization), etc. can be introduced into the modified alginates without changing its clinically advantageous properties, e.g., cell-specific compatibility, non-immunogenicity, and structure stability. for its ultimate use in medical practice. Among those reported data in literature, Oleic acid is well known as naturally occurring functional biomolecule in animals including human, and in vegetable fats and oils. Oleic acid is also a FDA-approved substance as pharmaceutical ingredient and food supplement. Mammary gland tissues are enriched with adipose tissues and it provides environmental niches for development and growth of mammary glands epithelial cells. Adipose tissues accumulates triacylglycerols and free fatty acids including monounsaturated fatty acids, oleic acids. Therefore, choosing oleic acid for the formulation of AGO gel is a mammary gland microenvironment mimicking and biocompatible material for further clinical and translational applications. Antitumor effect of oleic acid has widely been reported in literature, such as inhibition of over-expression of Her-2/neu, and intracellular calcium signaling pathway promoting the cell proliferation as discussed by Zeng at el. that oleic acid promoted the growth of non-malignant cells but it had the opposite effect in malignant cells. Therefore, based on those important pharmaceutic advantages, the long carbon chain of oleic acid can be a good hydrophobic ligand to modify the sodium alginate to form a new type of amphiphilic nanoparticles with specific multifunctionality.

There is still a need for the development of an inexpensive, efficient process of manufacturing nanoparticles for delivering a biologically active material or agent, and the nanoparticles prepared thereby.

SUMMARY OF THE INVENTION

Accordingly, the present invention provides an amphiphilic alginate-oleic acid (AGO) macromolecule and a process for preparing the macromolecule, wherein the macromolecule is amphiphilic and has clinically-accessible molecular size.

In one aspect, the present invention provides an alginate-oleic acid (AGO) macromolecule, which is composed of alginate and oleic acid linked with a spacer .

According to the invention, the AGO macromolecule is amphiphilic and has clinically-accessible molecular size, or anti-cancer activity.

In one example of the invention, the spacer is a diamine, preferably ethylenediamine or 1,6-diaminohexane. In a preferred embodiment, the spacer is ethylenediamine.

In one example of the invention the AGO macromolecule has the structure of formula I:

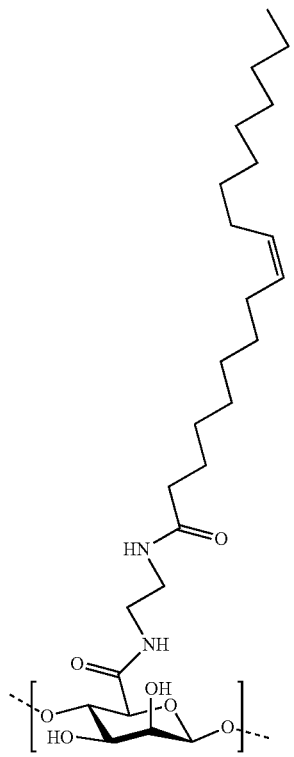

Formula I

In the present invention, it is found that the AGO macromolecule has self-assembly behavior in aqueous solution to form nanoparticles, and anti-cancer activity because of alginate.

In the invention, the AGO macromolecule has self-assembly behavior in aqueous solution to form nanoparticles.

Accordingly, AGO nanoparticle can be formed by self-assembly of the AGO macromolecules, which has excellent structural stability, colloidal stability and biocompatibility in vitro and in vivo.

According to the invention, the AGO macromolecule can form AGO nanoparticles that can be used as biomedical materials for multifunctional applications, such as a delivery system for an active agent, including but not limited to a drug or a biological agent or material, such as a peptide, a protein, an antibody, a serum product, a vaccine, a plurality of cells or stem cells.

In the invention, single, dual or multiple active agents can be encapsulated in the AGO nanoparticle, and accordingly the invention also provides a dual-drug nanoparticle or a multiple-drug nanoparticle.

In another aspect, the present invention provides a process for preparing the AGO macromolecule, which comprises the steps of:
(1) mixing oleic acid (OA) and N-(3-dimethylaminopropyl)-N'-ethylcarbodiimide hydrochloride (EDC-HCl) in dichloromethane (DCM), and then mixing it with ethylenediamine in DCM to obtain the reaction mixture; and allowing the reaction mixture to be reacted with brine $(NH_4Cl_{(aq)})$ to obtain a product, and extracted the aqueous phase of the product with DCM, and collecting the organic phase of the product, and allowing it to be dried over anhydrous magnesium sulfate, and concentrated under reduced pressure to obtain a crude product, and washing the crude product with diethyl ether, Tilted to obtain a modified OA; and
(2) dissolving sodium alginate in water to obtain a solution, and adjusting the pH of the solution to pH 3-4 using HCl, adding an aqueous solution of EDC-HCl slowly while adjusting the pH to pH 3-4 to complete the reaction to obtain the product, dialyzing the product against distilled water, and lyophilized and purified to obtain the AGO macromolecules.

It is to be understood that both the foregoing general description and the following detailed description are exemplary and explanatory only and are not restrictive of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred.

In the drawings.

Figure 1:
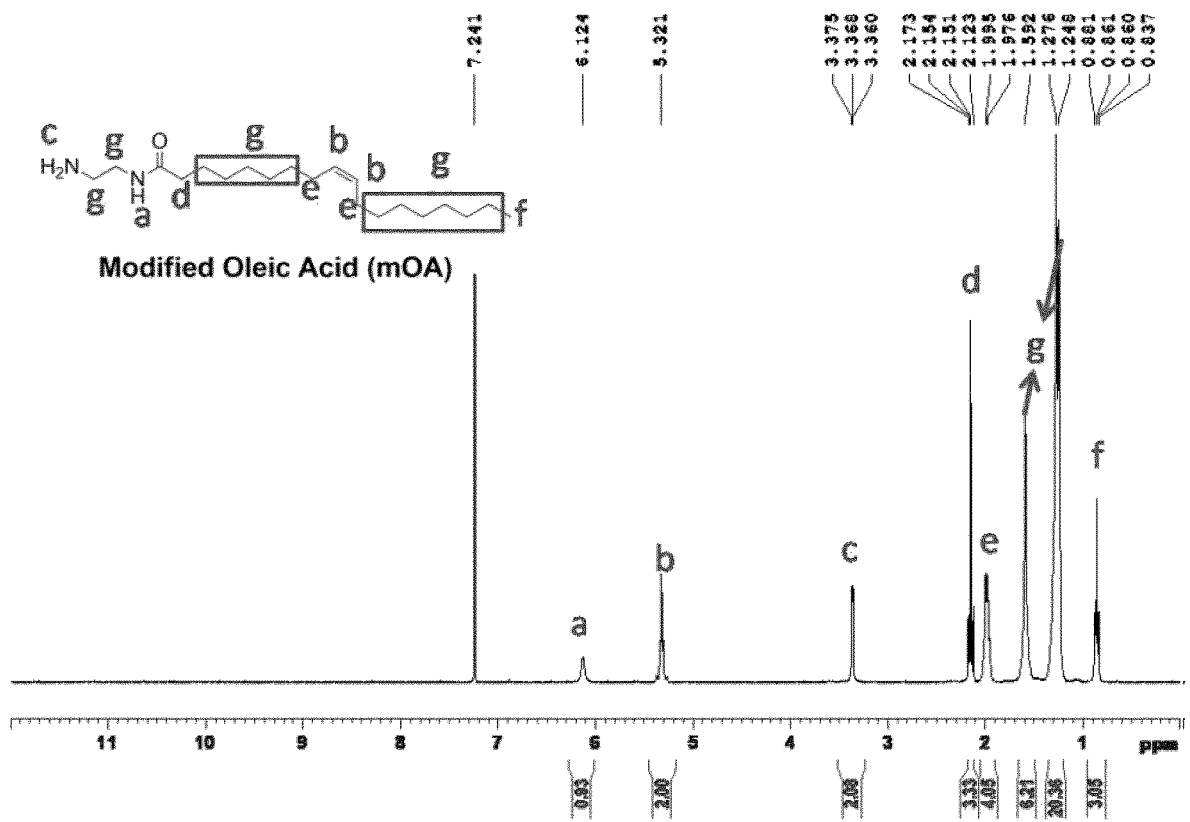
FIG. 1 provides the $^1H$ NMR spectra of the Alginate-mOA (AGO) nanoparticles according to the invention.

or spleen (J) were found in the group treated with 1.0 wt % the AGO nanoparticles (H&E stain. 400×).

DETAILED DESCRIPTION OF THE INVENTION

Unless defined otherwise, all technical and scientific terms used herein have the same meaning as commonly understood by a person skilled in the art to which this invention belongs.

The present invention provides a new macromolecule which can form nanoparticle having bio-functionality such as controlled cytocompatibility, controlled degradation (by kidney metablization), etc., which are introduced into the modified alginates without changing its clinically advantageous properties, e.g., cell-specific compatibility, non-immunogenicity, and structure stability. for its ultimate use in medical practice.

The present invention provides an alginate- oleic acid macromolecule, also called as "AGO macromolecule," which is composed of alginate and oleic acid linked with a spacer.

In one embodiment of the invention, the AGO macromolecule may be prepared in any commonly used or standard method. For example, ethylenediamine is used as a spacer to link hydrolyzed sodium alginate and oleic acid to prepare a novel amphiphilic sodium alginate-modified oleic acid (mOA) macromolecule, which is linked by two peptide bonds. Accordingly, the peptide-linked oleic acid can be cleaved and released from the modified alginate, due to that the fatty acid amide can be hydrolyzed by enzyme in mammals. The oleic acid-modified alginate nanoparticles can act as the materials for formation of therapeutic amphiphilic nanoparticles, used as a carrier for an active agent, such as a drug or a biological agent.

According to the invnetion, the AGO macromolecule provide anti-cancer activity caused from alginate. Such new amphiphilic AGO nanoparticles can form a micellar structure permitting drug load upon self-assembly in aqueous environment and is expected to facilitate subsequent biomedical applications.

Alginate

Alginate is unbranched anionic polysaccharide consisting of 1→4 linked β-D-mannuronic acid (M) and C-5 epimer α-L-guluronic acid (G):

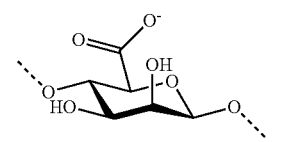

1→4 linked β-D-mannuronic acid (M)

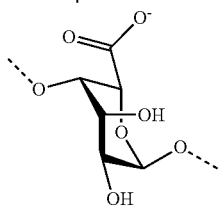

C-5 epimer α-L-guluronic acid (G)

Such anionic polysaccharide copolymer is extracted from nature brown algae such as *Macrocystis pyrifera, Laminaria hyperborea, Ascophyllum nodosum,* and it also an exopolysaccharide of bacteria, including *Pseudomonas, Azotobacter.*

Alginate may be manufactured by any conventional methods. For example, alginates can be produced based on algae sources. Alginates in intracellular matrix nature brown algae as gel contain sodium calcium, magnesium, strontium and barium ions, such that the counterion compositions are decided by the ion-exchange equilibrium with seawater. Alginate extraction procedure from algae is shown below.

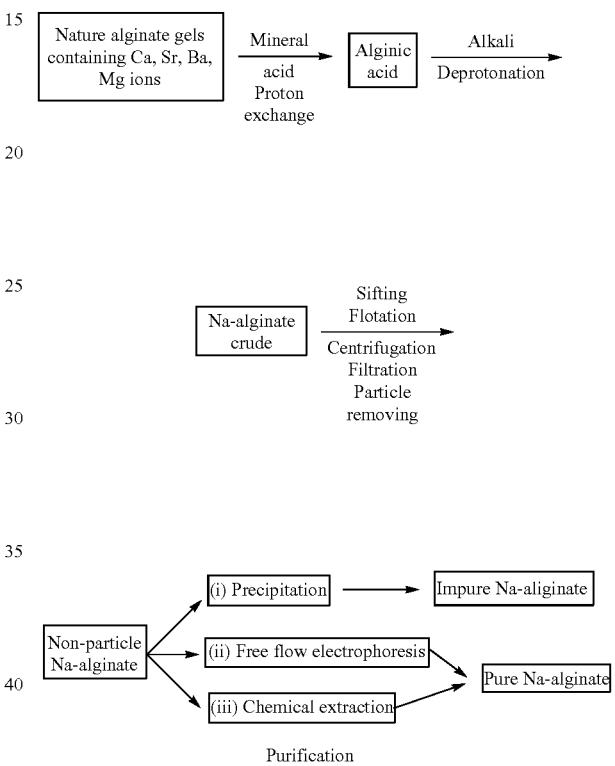

Alginate Extraction Procedure Form Algae

Firstly, nature alginate gels are removed counterion by proton exchange using 0.1-0.2 M mineral acid. Alginic acid is obtained though this step. In the second step, insoluble alginic acid is dissolved by neutralization with alkali such as sodium hydroxide or sodium carbonate to form Na-alginate. After that, particulate matters such as ash, dust and other insoluble impurities form nature algae are removed by separation processes such as sifting, flotation, centrifugation and filtration. There are three methods known for the final step of alginate manufacture: (i) precipitation through alcohol, calcium chloride or a mineral acid; (ii) free flow electrophoresis; (iii) chemical extraction with Ba-alginate gels. After step (i), alginates still contain several mitogens and cytotoxic impurities leading to unsuitable for biomedical application. Both steps (ii) and (iii) can effectively solve this problem but step (ii) is cost-ineffective and time consuming to fit commercial large scale production. $Ba^{2+}$ plays an important role in step (iii). After Ba-alginate gels had formed, the mitogens and cytotoxic impurities were first eluted from Ba-alginate beads by treatment with various agents followed by ethanol extraction and then the pure alginate beads were dissolved in alkaline solutions. The solution was dialyzed in order to remove the $Ba^{2+}$ and the reagents and finally the Na-alginate was precipitated by the addition of ethanol.

Sodium Alginate

Sodium alginate, a kind of biopolymer, is well known for biocompatible, non-toxic and non-immunogenic. Alginates had been widely applied as medical material such as matter delivery, wound dressing, cell culture and tissue regeneration. Alginates are generally used as thickening, gel forming, and stabilizing agents in pharmaceutical applications. Oral dosage forms are the most frequent in currently pharmaceutical applications. Alginates form ionic complexes with chitosan, due to opposite charges. Such ionic complexes show pH-dependent because a higher swelling degree and faster drug release were observed from the particulate systems in a simulated enteric environment (pH 7.5), as compared to a simulated gastric environment (pH 1.2). This special property of pH-dependent swelling makes it capable of passive targeting the gastrointestinal tract.

Oleic Acid

Oleic acid (OA) is one kind of monounsaturated fatty acids, having the chemical structure below:

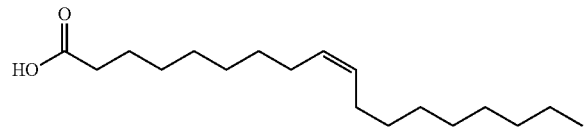 [SMILES: CCCCCCCC/C=C\CCCCCCCC(=O)O]

Oleic acid (OA) is one kind of monounsaturated fatty acids occurring naturally in various animal and egetable fats and oils. Its pharmacodynamic actions and mechanisms of these effects remain controversial. It has been reported previously that OA reduces concentration and oxidation of low density lipoproteins (LDL); and decreases the risk of cardiovascular diseases (CVD). It has also been reported that oleic acid has antitumor activity, mainly depend on its ability of inducing apoptosis and inhibiting cell proliferation.

Antitumor effects of OA mainly depend on its ability of inducing apoptosis and inhibiting cell proliferation, particularly the effect in inhibition of over-expression of Her-2/neu to limit tumor proliferation.

Preparation of Alginate-mOA Nanoparticle (AGO Nanoparticles)

According to the invention, sodium alginate is used to obtain modified alginate, and then to synthesize modified Alginate-mOA (AGO) nanoparticles.

In one example of the invention, alginate is reacted with an aqueous solution of acetic acid. The reaction mixture is neutralized, and then dialyzed against distilled water to remove low-molecular-weight impurities; separated the precipitate by a centrifuge; and lyophilized afterwards.

Then, modified oleic acid (mOA) is synthesized by the method as indicated below. Oleic acid and N-(3-Dimethylaminopropyl)-N'-ethylcarbodiimide hydrochloride (referred to as EDC-HCl) are dissolved in dichloromethane (referred to as DCM) together, and then mixed with ethylenediamine (1.34 mL) in DCM. The reaction mixture is reacted with triethylamine to obtain the crude product, the crude product is mixed with brine ($NH_4Cl_{(aq)}$), and the aqueous phase of the product is extracted with DCM and the organic phase was collected, dried over anhydrous magnesium sulfate, and concentrated under reduced pressure to remove DCM. Next, such crude is added to diethyl ether, sonicated in ultrasonic bath to remove residual oleic acid, and the precipitate is collected by using pumping filter. Finally, diethyl ether is removed under reduce pressure. The white powder for pure modified oleic acid (mOA) is obtained. The scheme of the synthesis of modified oleic acid (mOA) is given below:

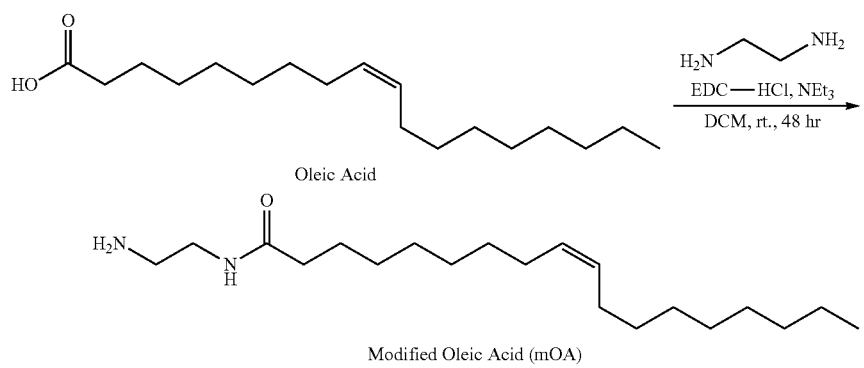

Sodium alginate (0.5 g) was dissolved in water to a concentration of 3.0 wt %. The pH of the solution was adjusted to 3.4 by using 0.4 M HCl. Next, an aqueous solution of EDC-HCl was added slowly to the system, and the pH of the reaction mixture was maintained at 3.4 by the addition of 0.4 M HCl. To prepare different degree of substitution (DS) of AGO, the amount of EDC-HCl ($N_{EDC-HCl}/N_{hexuronic}$=0.2, 0.4, 0.6, 0.8 and 1.0) was 0.096 g, 0.857 g, 0.288 g, 0.383 g, 0.479 g, respectively. After 5 min of reaction, mOA ($N_{amine}/N_{hexuronic}$=1.05, in an amount of 0.857 g) was added, and the mixture was stirred uniformly at 35° C. for 24 hr. When the reaction was completed, dialyzed against distilled water for 3 days to remove low-molecular-weight impurities; separated the precipitate which was unreacted mOA by using Centrifuge (9000 rpm, 15 min); and lyophilized subsequently. After lyophilization, residual organic impurities were removed by using Soxhlet extraction with acetone for 3 days. We used vacuum system to remove acetone. Then, we collected a pure light yellow powder for a novel amphiphilic molecule, called as AGO nanoparticles.

According to the invention, the AGO nanoparticles were characterized and tested. It is found that the AGO nanoparticles are structurally stable, and biocompatible, and have excellent cytocompatibility and biosafety.

The present invention is further illustrated by the following examples, which are provided for the purpose of demonstration rather than limitation.

EXAMPLES

1. Methods and Materials

1.1 Degradation with Hydrolysis Under Acidic Condition

Sodium alginate powder (5 g) was dissolved in 45 mL of 1 M acetic acid first and stirred uniformly under 85° C. for 2, 6, 24, and 48 hr, respectively. When the reaction was completed, the reaction mixture was cooled to room temperature, neutralized with 5 M sodium hydroxide; dialyzed against distilled water for 2 days to remove low-molecular-weight impurities; separated the precipitate by using Centrifuge (9000 rpm, 15 min); and lyophilized afterwards. Finally, we could get four kinds of different molecular weight sodium alginate with yield as high as 90%.

1.2 Characterization of Low-Molecular Weight Sodium Alginate $^1$H Nuclear Magnetic Resonance ($^1$H NMR)

$^1$H Nuclear magnetic resonance ($^1$H NMR) was used to identify chemical structure of compound. The purpose of this experiment is to check the effect of hydrolysis with different time for sodium alginates. 50 mg of non-hydrolyzed and hydrolysis with different time sodium alginates were dissolved separately in 1 mL deuterium oxide and placed into NMR tube for each composition. The NMR spectra of aforementioned samples were recorded by America VARIAN 300 MHz NMR spectrometer.

Fourier-Transform Infrared Spectroscopy (FTIR)

To observe the variation of functional groups in non-hydrolyzed sodium alginate and sodium alginates with different hydrolyzed time were measured by Fourier-transformed infrared spectroscopy (FTIR). Small amount of each sodium alginate powder was directly put on attenuated total reflectance (ATR) FTIR accessory (Quest ATR S/N U54913, Specac) for further investigation. Then, the FTIR spectra of five sodium alginate compositions (one non-hydrolyzed and four hydrolyzed samples) were record (32 scans with a resolution of 4 cm$^{-1}$) on Unican Mattson Mod 7000 FT-IR.

Gel Permeation Chromatography (GPC)

The variation of molecular weight ($M_w$) and polydispersity index (PDI) of sodium alginates with different hydrolyzed time were both measured by JASCO gel permeation chromatography (PU-4180 RHPLC Pump, RI-4030 Refractive Index Detector). Molecular size profile of sodium alginate was determined from two TSKgelSuperMultiporePW-M columns (dimensions 6×150 mm) linked in series in oven (40° C.). Each kind of sodium alginate was dissolved in 0.069 M PBS/0.005 M NaCl as an eluent. A flow rate was 0.5 mL/min. SIGMA-ALDRICH dextran standards was used for the column ($M_w$: 5, 12, 50, 150, 270, 410, 670 kDa). The amount injected was 20 μL for each time. The $M_w$ and PDI were calculated by the equation:

$$\log(Mw)=36.4468+(-8.51607)tR+0.790918tR^2+(-0.0260822)tR^3 \quad PDI=M_w/M_n$$

where tR: retention time. $M_w$: mass-average molecular weight.

Oleic acid and N-(3-Dimethylaminopropyl)-N'-ethylcarbodiimide hydrochloride (referred to as EDC-HCl) were dissolved in dichloromethane (referred to as DCM) (80 mL) together and stirred uniformly at 4° C. for 30 min. After 30 min, we prepared another vial bottle with a small amount of ethylenediamine in DCM (20 mL). Subsequently, the vial bottle with ethylenediamine mixed with the first vial bottle which has stirred under 4° C. for 30 min, injecting triethylamine (3.4 mL), and stirring homogenous at room temperature for 48 hrs afterwards. When the reaction was completed, the crude was mixed with brine ($NH_4Cl_{(aq)}$). The aqueous phase was extracted with DCM and the organic phase was collected, dried over anhydrous magnesium sulfate, and concentrated under reduced pressure to remove DCM. Next, such crude was added the diethyl ether, sonicated for 1.5 hr in ultrasonic bath to remove residual oleic acid, and collected precipitate by using pumping filter. Finally, diethyl ether was removed under reduce pressure. Then, we could get the white powder for pure modified oleic acid (mOA).

Sodium alginate was dissolved in water to a concentration of 3.0 wt %. The pH of the solution was adjusted to 3.4 by using 0.4 M HCl. Next, an aqueous solution of EDC-HCl was added slowly to the system, and the pH of the reaction mixture was maintained at 3.4 by the addition of 0.4 M HCl. To prepare different degree of substitution (DS) of AGO, the amount of EDC-HCl ($N_{EDC-HCl}/N_{hexuronic}$=0.2, 0.4, 0.6, 0.8 and 1.0) was 0.096 g, 0.857 g, 0.288 g, 0.383 g, 0.479 g, respectively. After 5 min of reaction, mOA ($N_{amine}/N_{hexuronic}$=1.05) was added, and the mixture was stirred uniformly at 35° C. for 24 hr. When the reaction was completed, dialyzed against distilled water for 3 days to remove low-molecular-weight impurities; separated the precipitate which was unreacted mOA by using Centrifuge (9000 rpm, 15 min); and lyophilized subsequently. After lyophilization, residual organic impurities were removed by using Soxhlet extraction with acetone for 3 days. We used vacuum system to remove acetone. Then, we collected a pure light yellow powder as the resulting AGO powder.

1.3 Characterization of Modified Oleic Acid and Alginate-mOA Nanoparticle $^1$H Nuclear Magnetic Resonance ($^1$H NMR)

The samples were prepared by dissolving mOA and AGO powder, 50 mg, into deuterochloform/ deuterium oxide 1 mL and placed into NMR tube, respectively. The chemical structure of AGO and mOA were identified separately by $^1$H Nuclear magnetic resonance ($^1$H NMR).

Fourier-Transform Infrared Spectroscopy (FT-IR)

The functional groups in mOA and AGO powder were measured using FTIR described in the examples below.

Elemental Analyzer (EA)

We placed 20 mg for each AGO (24 hr, 0.4, 0.6, 0.8, 1.0) in vial bottle, and sent it to National Taiwan University Instrumentation Center afterwards. The degree of substitution (DS) of the SAO can calculate by the following formula reported by Yang at el., according to percentage content of nitrogen (N) in the SAO measured by an elemental analyzer. [37]

$$N \% = \frac{M_3 * DS}{M_1 * DS + M_2(1 - DS)}$$

$$DS \ (\%) = \frac{N \% * M_2}{M_3 - N\% * M_1 + N \% * M_2}$$

M1: the molecular weight of substituted monomer.
M2: the molecular weight of non-substituted monomer.
M3: the molecular weight of nitrogen.

Fluorescence Spectrophotometer (FL)

The critical micelle concentrations (CMC) of amphiphilic AGO nanoparticle of different DS in distilled water were examined by the fluorescence spectrophotometer (FL-2700) using pyrene as the probe. The following steps are the samples preparation of each AGO nanoparticle of different DS. First, pyrene-containing acetone solution ($1.0*10^{-4}$ M) was dropped in fifteen vial bottles, respectively. At the same time, fifteen different concentrations of AGO solution was prepared that AGO nanoparticles dissolved in distilled water (concentration (wt %): 1, 0.5, 0.25, 0.125, 0.0625, 0.03125, 0.015625, 0.0078125, 0.00390625, 0.001953125, 0.0009765625, 0.0004882813, 0.0002441407, 0.0001220704, 0.0000610352). After the acetone was evaporated by vacuum system, fifteen different concentrations of AGO nanoparticle solution were added to the vial bottle, respectively. Next, the mixtures were stirred at room temperature for 24 hr under strictly exclusion of light before the experiment. The probe was excited at 343 nm and the emission spectra were recorded in the range of 300-500 nm at an integration of 1.0 s. The excitation and emission slit opening were 5 and 5 nm, respectively. PMT voltage is 400 V. Response is 0.04 s. Scan speed is 60 nm/min.

Dynamic Light Scatting (DLS)

The mean size and size distribution of the AGO nanoparticle of different DS were measured by dynamic light scatting (DLS, BI-200SM Goniometer DLS, Brookhaven Inc., Holtsville, N.Y.). The samples were prepared by dissolving AGO nanoparticle of different DS into distilled water and stirred at room temperature for 24 hr before loading into the cuvette.

Zeta Potential

The zeta potential (Beckman Coulter, Inc., USA) of AGO nanoparticle of different DS were estimated by Laser Doppler Anemometry (Beckman Coulter, Inc., USA). Before loaded the solution into the flow cell for zeta potential measurement, the samples were prepared by dissolving AGO nanoparticle of different DS into distilled water and stirred at room temperature for 24 hr.

1.4 Cell Culture and In-Vitro Cytotoxicity

SKBR-3 and MDA-MB-231 cells, HER-2 positive and triple negative breast cancer cells respectively, were treated with AGO for 24 hr. H184B5F5/M10 (Human mammary epithelial cell, derived from BCRC; BCRC number: 60197), MDA-MB-231 (Human mammary epithelial cancer cell, derived from ATCC; ATCC number: CRM-HTB-26™) and SK-BR-3 (Human mammary epithelial cancer cell, derived from ATCC; ATCC number: HTB-30™) were used in cytotoxicity test. The cellular viabilities were determined by MTT.

2. Results

After extensive hydrolysis for different periods, the resulting sodium alginate shows a decrease in molecular weight ($M_w$) and poly-dispersity index (PDI), suggesting a narrower distribution of molecular weight upon intensive hydrolysis, as listed in Table 1, indicating the molecular weight distribution is getting narrow with hydrolysis. The average MW can be reduced to a range of about 23,000-35,000 after 24-48 h of hydrolysis, which accordingly can be metabolizd by renal clearance in kidney (well below the threshold value of 60 KDa and should be accessible in clinical use. The hydrolyzed sodium alginate of various molecular weight also illustrated identical molecular structure and functional groups as revealed using $^1$H NMR and FTIR spectra to confirm the structures.

TABLE 1

Characterization of sodium alginate with different hydrolysis time.

| Hydrolysis duration (h) | $M_w$ (g/mol)$^a$ | PDI $(M_w/M_n)^a$ |
|---|---|---|
| As-received SA | >600,000 | 13.5991 |
| 2 | 249,891 | 3.3321 |
| 6 | 140,768 | 1.9527 |
| 24 | 35,150 | 1.4324 |
| 48 | 23,486 | 1.3796 |

$^a$Determined by SEC using dextran as a standard.

To further modify with hydrophobic oleic acid, the sodium alginate with 24-h hydrolysis was used as a model matrix for the forthcoming investigation, because of its moderate hydrolysis period (where an abrupt increase in viscosity for the hydrolyzed solution after 24-h hydrolysis is apparently not suggested for further processing) and favorable molecular weight and distribution for medical uses.

3.1 Formation of Modified Oleic Acid (mOA)

The chemical structure of the modified oleic acid was confirmed by $^1$H Nuclear Magnetic Resonance spectra, showing the weak peak at 6.12 ppm represented the proton on amide group (—NH—C═O—) which is marked as "a"; the peak at 5.32 ppm represented the protons on ethylene group (—CH═CH—) which is marked as "b"; the central peak at 3.37 ppm represented the protons on amine group (—NH$_2$) which is marked as "c"; the peaks between 2.12-2.17 ppm represented the protons on the carbon near amide group (—NH—C═O—CH$_2$—) which is marked as "d"; the peaks between 1.98-2.00 ppm represented the protons on the carbons near ethylene group (—CH$_2$—CH=CH—CH$_2$—) which is marked as "e"; the peaks at 0.84-0.88 represented the protons at the terminal of oleic acid (—CH$_3$) which is marked as "f"; and the peaks between 1.25-1.59 ppm represented the protons of other carbons (—CH$_2$—CH$_2$—CH$_2$— and NH$_2$—CH$_2$, —CH$_2$—NH$_2$—) which is marked as "g". Noteworthy, the broad peak through 10.0-10.7 ppm represented the proton on carboxylic acid (—COOH) disappeared, and the peaks represented the protons on the carbon near carbonyl group (—C=O—CH$_2$—) ranging from 2.30-2.35 ppm to 2.12-2.17 ppm appeared after the reaction. The peak of the proton on carboxylic acid disappeared which is due to amide group displaced the carboxylic acid group. The peak displacement of the proton on the carbon near carbonyl group was due to the electron-withdraw ability of carboxylic acid which is stronger than amide group, leading to different deshielding effect. The different chemical shift, where the peaks of the protons on the carbon near amide group are more upfielded than the peaks of the protons on the carbon near carboxylic acid group. This revealed that mOA was successfully synthesized.

The functional groups of the mOA was identified using FT-IR analysis. It demonstrated that in comparison of the FT-IR spectra for mOA and oleic acid with those differences in chemical structure before and after OA modification. The peak near a broad band centered at 3400 cm$^{-1}$ represented the N—H stretching vibrations for primary amine. The peak near a medium signal at 3297 cm$^{-1}$ represented the N—H stretching vibrations for secondary amide, while the peak near the strong signal at 2971 cm$^{-1}$ due to C—H stretching vibrations. The peak near the strong signal at 1640 cm$^{-1}$ represented C=O stretching vibrations for amide and the peak near the strong signal at 1600 cm$^{-1}$ represented N—H bending vibrations for amide. It was observed that the strong signal at 1708 cm$^{-1}$ represented C=O stretching vibrations for carboxylic acid group in oleic acid disappeared. Therefore, from the spectral information, it is substantiated that oleic acid was successfully modified by ethylenediamine.

3.2 Synthesis and Characterization of Alginate-mOA Nanoparticle $^1$H Nuclear Magnetic Resonance was used to identify the chemical structure of AGO. The spectra were illustrated in FIG. 1. The peak between 0.91-0.96 ppm represented the protons at the terminal of oleic acid (—CH$_3$) which is marked c; the peak at 2.74 ppm represented the protons at the carbon (—CH$_2$—CH$_2$—) which is marked b; the peaks between 2.93-3.09 ppm represented the protons on the carbons near including ethylene group (—CH$_2$—CH=CH—CH$_2$—) and near amide group (—NH—C=O—CH$_2$—) which is marked as "a"; the peaks between 3.5-4.5 ppm represented the protons on the pyranose ring. Through the marks of a, b and c could be used to confirm that the modified oleic acid was successfully bonded with sodium alginate. On the other hand, the signal strength of the marked peaks was increased obviously with the reacted amount of EDC-HCl. The reason is that the marked peaks were all from oleic acid and the increase of reacted amount of EDC-HCl could raise the degree of substitution of oleic acid. The results suggested that AGO was successfully synthesized.

Figure 2:
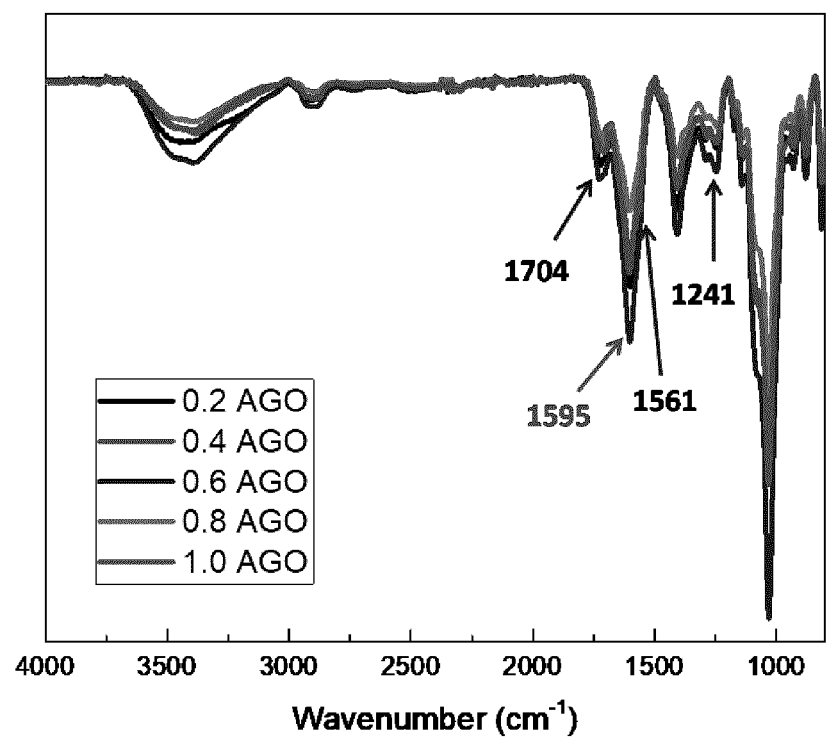
FIG. 2 provides the FT-IR spectra of the Alginate-mOA (AGO) nanoparticles with different ratios, ranging from 0.2, 0.4, 0.6, 0.8, to 1.0, of $N_{EDC-HCl}/N_{hexuronic}$, as symbolized in the inset list.

FT-IR analysis revealed that the chemical structure of Alginate-mOA (AGO) with different ratios of N$_{EDC-HCl}$/N$_{hexuronic}$, as shown in FIG. 2, the respective functional groups or chemical bonds were marked. IN comparison with the inherent functional groups of sodium alginate, FIG. S2, the difference between two compounds was the peak near 1704 cm$^{-1}$ represented the C=ONH for amide groups; the peak near 1561 cm$^{-1}$ which is overlap with the C=OO$^-$ signal (1595 cm$^{-1}$) represented the N—H bending vibration; and the peak near 1241 cm$^{-1}$ represented the C—NH for amide groups, including a new functional group (—NH—CO—) formed in AGO molecule. Therefore, it showed that the new compound, Alginate-mOA (AGO), was synthesized successfully.

To determine the content of oleic acid linked with AGO from the reaction with different amount of EDC (as a ratio of N$_{EDC-HCl}$/N$_{hexuronic}$). The formation of peptide bond is the most obvious difference between modified version, i.e., AGO and 24-h hydrolyzed SA. The content of nitrogen atoms which are contributed by peptide bond can be quantified by Elemental Analyzer. Then, the degree of substitution was calculated by the following equations, where M$_1$ represents the molecular mass of modified monomer; M$_2$ represents the molecular mass of non-modified (original) monomer; and M$_3$ represents the molecular mass of nitrogen atom.

$$N\ \% = \frac{M_3 * DS}{M_1 * DS + M_2(1 - DS)}$$

$$DS\ (\%) = \frac{N\ \% * M_2}{M_3 - N\ \% * M_1 + N\ \% * M_2}$$

The results are listed in Table 2 where the degree of substitution (DS) is increased with increasing amount (and ratio as well) of EDC-HCl. These results substantiated that a successful control over the degree of substitution of AGO can be feasibly manipulated through a pre-determined modification scheme with specific amount of EDC-HCl.

TABLE 2

Degree of substitution of Alginate-mOA (AGO) with different ratios of N$_{EDC-HCl}$/N$_{hexuronic}$ ranging from 0.2, 0.4, 0.6, 0.8, to 1.0, where an stepwise increment of the DS can be measured and observed.

| Sample Name | Degree of Substitution (DS, %) |
|---|---|
| 0.2 AGO | 16.4 |
| 0.4 AGO | 29.6 |
| 0.6 AGO | 39.4 |
| 0.8 AGO | 58.8 |
| 1.0 AGO | 66.4 |

3.3 Critical Micelle Concentration (CMC) of the AGO Nanoparticles

Figure 3:
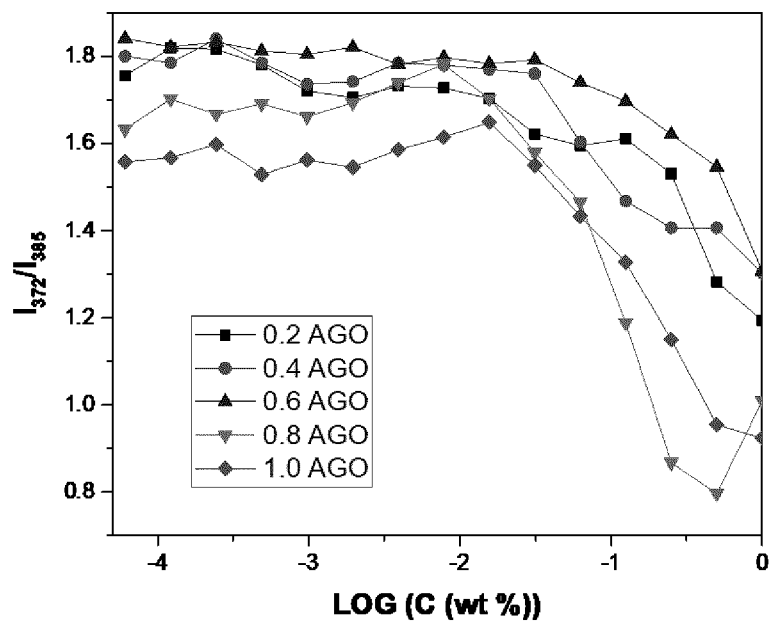
FIG. 3 shows the change of $I_{373}/I_{385}$ value of Alginate-mOA (AGO) with different ratios of $N_{EDC-HCl}/N_{hexuronic}$, designated as different degrees of substitution.

Critical Micelle Concentration (CMC) is a featured character of the ability of self-assembly behavior for particularly amphiphilic molecules to form well-defined aggregate structure while dispersing in aqueous environment. The lowest concentration for the formation of micelle, i.e. CMC can be determined using pyrene as a probe to detect the intensity ratio (I$_{372}$/I$_{385}$) of the AGO nanoparticle with different degrees of substitution by using fluorescence spectrophotometer. The interception of slope change in the curve which is formed by I$_{372}$/I$_{385}$ corresponding to logarithmic concentration of AGO with different degree of substitution represents the CMC for each AGO composition. The relationship between I$_{372}$/I$_{385}$ and logarithmic concentration of AGO with different degree of substitution was demonstrated in FIG. 3, where the CMC values corresponding to AGO with different degree of substitution are summarized in Table 3.

Figure 4:
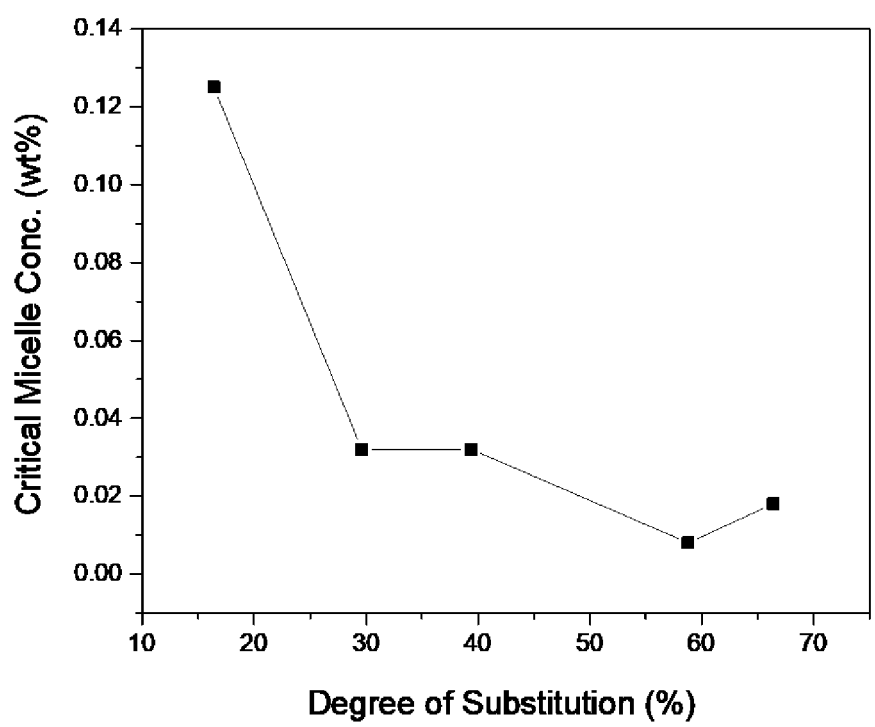
FIG. 4 shows the variation of the Critical Micelle Concentration (CMC) values of the AGO nanoparticles with different degrees of substitution (DS).
Figure 5:
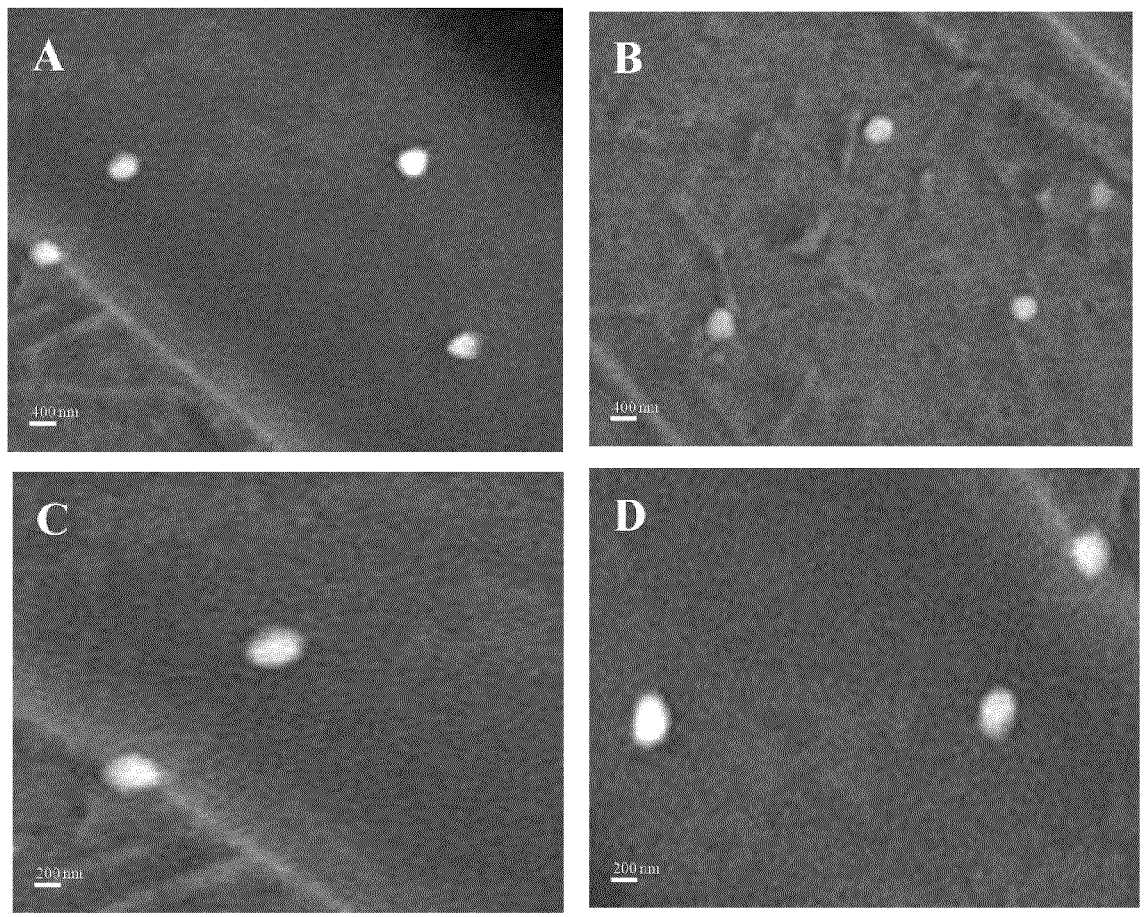
FIG. 5 shows the nano-structural morphology of the AGO nanoparticles with different ratios of $N_{EDC-HCl}/N_{hexuronic}$, which were examined by field-emission scanning electron microscopy; wherein FIG. 5(A) 0.4 AGO, (B) 0.6 AGO, (C) 0.8 AGO, (D) 1.0 AGO.

The CMC value decreased with the degree of substitution, and to the lowest CMC value of 0.008 wt % for the AGO with DS of 58.8%, represented as 0.8 AGO. However, CMC increased further to a value of 0.018% when DS reached to 66.4%, represented as 1.0 AGO. This finding clearly revealed the existence of an optimal balance between hydrophilicity and hydrophobicity along with the AGO nanoparticle, resulting in amphiphilicity of the 0.8 AGO turns to be most thermodynamically feasible to form aggregate at lowest concentration. From the relationship between degree of substitution and critical micelle concentration, FIG. 4, we conjectured that sodium alginate was modified by overfull oleic acid (DS=~66.4%) resulting in excessive hydrophobicity and then broke the equilibrium of amphiphilicity, giving rise to a rapid increase in CMC. Accordingly with the lowest DS of 16.4%, the highest CMC value of 0.125 wt % was measured for 0.2 AGO, which became thermodynamically unfavorable to form aggregate till highest AGO concentration required in aqueous environment, which is over 15-fold higher in AGO concentration required to form aggregate structure by self-assembly compared with 0.8 AGO.

TABLE 3

Important physico-chemical properties of the of Alginate-mOA (AGO) with different ratios of $N_{EDC-HCl}/N_{hexuronic}$ (as symbolized in "Sample Name" column) dissolved in ddH$_2$O, where AGO concentration was fixed at 0.05 wt %.

| Sample Name | CMC (wt %) | Size (nm) | Zeta Potential (mV) |
| --- | --- | --- | --- |
| 24-hr SA | NA | NA | −38.68 |
| 0.2 AGO | 0.125 | NA | −38.31 |
| 0.4 AGO | 0.032 | 385.45 ± 128.36 | −31.37 |
| 0.6 AGO | 0.032 | 350.35 ± 134.36 | −25.29 |
| 0.8 AGO | 0.008 | 330.27 ± 135.70 | −24.33 |
| 1.0 AGO | 0.018 | 450.52 ± 119.76 | −22.92 |

Upon determining the CMC for the AGO with different DS, the resulting AGO particle size was examined by dynamic light scattering. As given in Table 3, where the AGO concentration of 0.05% was used for all AGO compositions and 24-h SA (which means the sodium alginate treated with 24-h hydrolysis without further OA modification). There is no sign of particle-induced measure for both 0.2 AGO and 24-SA samples, which suggested no particular entity formed upon the dispersion of both 0.2 AGO and 24-h SA in aqueous solution. The 0.2 AGO has a CMC of 0.125% which is much higher than the 0.05% concentration used to prepare the sample solution and in the meantime, SA is simply a linear nanoparticle without the presence of hydrophobic interaction to cause self-assembly mechanism to form aggregate structure. Therefore, DLS appears to substantiate this explanation. On contrast, the rest AGO compositions having a CMC much lower than 0.05% revealed a clear and strong signal of forming particular entity, where the particle size distributed between 200-600 nm or in average, between 300-450 nm. This evidences the presence of self-assembly capability imparted with the AGO nanoparticles synthesized in this work, as aforementioned.

3.3 Zeta Potential of AGO Nanoparticles

Zeta potential of a solid entity is affected fundamentally by surface property of the entity, pH value, presence of electrolyte and concentration of electrolyte in a given solution. Here we prepared the same solution composition and condition as used for DLS measurement. The resulting zeta potential of the AGO compositions was also listed in Table 3, in comparison with 24-h SA molecule. All the samples illustrated a negative charge which is clearly caused by carboxylate groups along with the backbone of native sodium alginate. The zeta potential is decreased with the degree of substitution due to the decreasing amount of carboxylate groups in the AGO as a result of increasing substitution of oleic acid toward the carboxylate groups of AGO. Zeta Potential is also an indicator to determine the stability of the colloidal solution system. The absolute value of zeta potential for all the AGO compositions was well above 20 mV suggesting the AGO colloidal nanoparticles possess sufficient dispersion stability in solution.

Considering the physicochemical properties disclosed in Table 3, it is strongly suggested that the AGO nanoparticles designed and prepared in this work may be medicinally useful in biomedical uses such as drug delivery nanosystem.

3.4 Nanostructural Morphology

FIGS. 5a, 5b, 5c, and 5d show the nanoparticular morphology of the AGO nanoparticles symbolized with 0.4 AGO, 0.6 AGO, 0.8 AGO and 1.0 AGO compositions, respectively. The particles illustrated an average size of 300-500 nm in diameter, which appears resemble that determined by DLS aforementioned. The nanoparticles of AGO (0.4, 0.6, 0.8, 1.0) all exhibit a sphere-like geometry, suggesting a direct evidence as a result of self-assembly disclosed above, where an energy-favorable structure was evolved for the AGO nanoparticles dissolved in aqueous solution and is commonly observed in many amphiphilic molecules disclosed in literature. Such a sphere-like morphology also encourages to be applicable in cellular delivery for anti-cancer therapeutics via blood circulation.

4. In Vitro Cytotoxicity

Figure 6A:
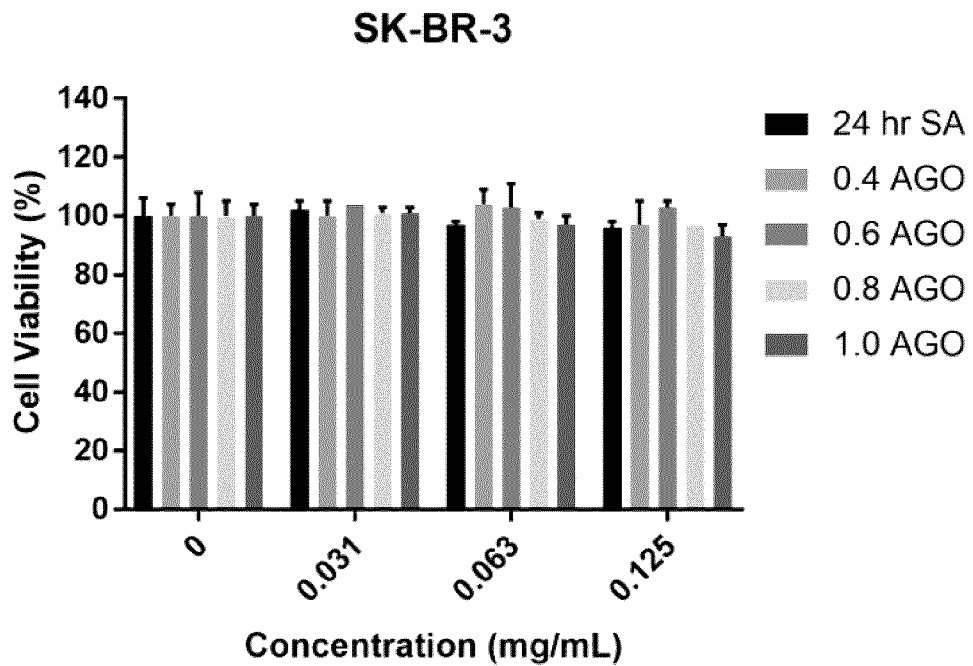
FIG. 6 shows the cytotoxicity of the AGO nanoparticles, namely the cell viability (%) of the control, 24 hr SA, and the different AGO nanoparticles, 0.4 AGO, 0.6 AGO, 0.8 AGO and 1.0 AGO against SK-BR-3, MDA-MB-23 land H184B5F5/M10.
Figure 6B:
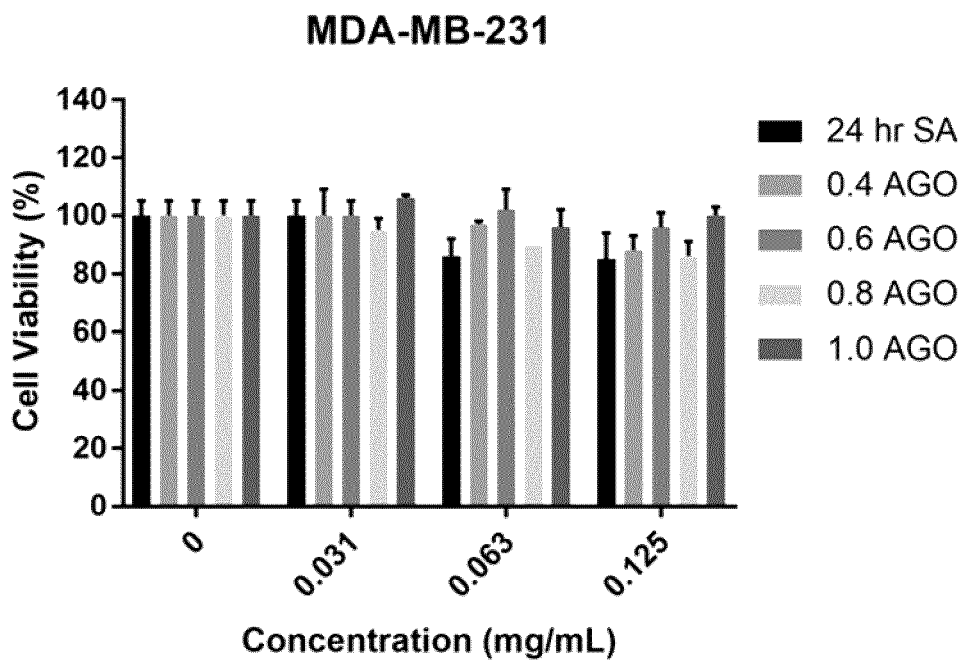
Figure 6C:
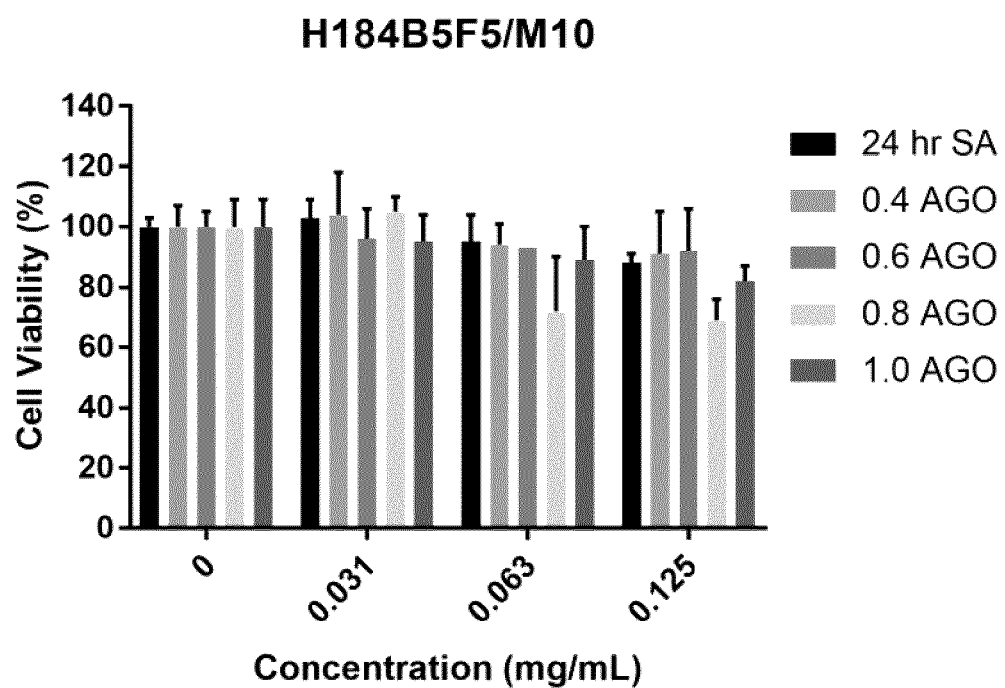

To evaluate the cytotoxicity of the AGO nanoparticles with different compositions (DS), the AGO samples were used to against two highly malignant breast cancer cells, SKBR-3, MDA-MB-231, and Human mammary epithelial cell, H184B5F5/M10, for a period of 24 hours. The SKBR-3 and MDA-MB-231 cells, designated as HER-2 positive and triple negative breast cancer cells, respectively. The cellular viabilities were determined by MTT. As illustrated in FIG. 6, the toxicities of AGO nanoparticles for these two cancerous cells are minimal. In both cells, various AGO formulations (0.4, 0.6, 0.8, 1.0 AGO) with increasing concentrations ranging from 0 to 0.125 mg/mL showed little-to-no toxicity for both cells. However, in H184B5F5/M10 cells, except the compositions of 0.8 AGO and 1.0 AGO, showing some inhibitory behavior, the rest compositions appears to be non-toxic toward cellular viabilities. The cytotoxicity is apparently to be concentration-depending, and in the range of this study, the AGO is considered to be cytocompatibility for both normal cells and cancerous cells. Besides, these results may indicate a biological digestion enzyme resistant AGO formations. Since when incubating AGO formulations with cells and culture mediums, the effects mediated by released free oleic acid on breast cancer were not observed. This encourages a further investigation to evaluate the toxicity in-vivo.

5. In-Vivo Evaluation

Pathological changes induced by intravenous injection of the AGO nanoparticles in mice were evaluated. This test, 20 male and 20 female ICR mice, 7 weeks old, were divided into 4 groups consisting of dosages of AGO at 0.25, 0.5, 0.8, and 1 wt % in aqueous PBS buffer solution.

Figure 7:
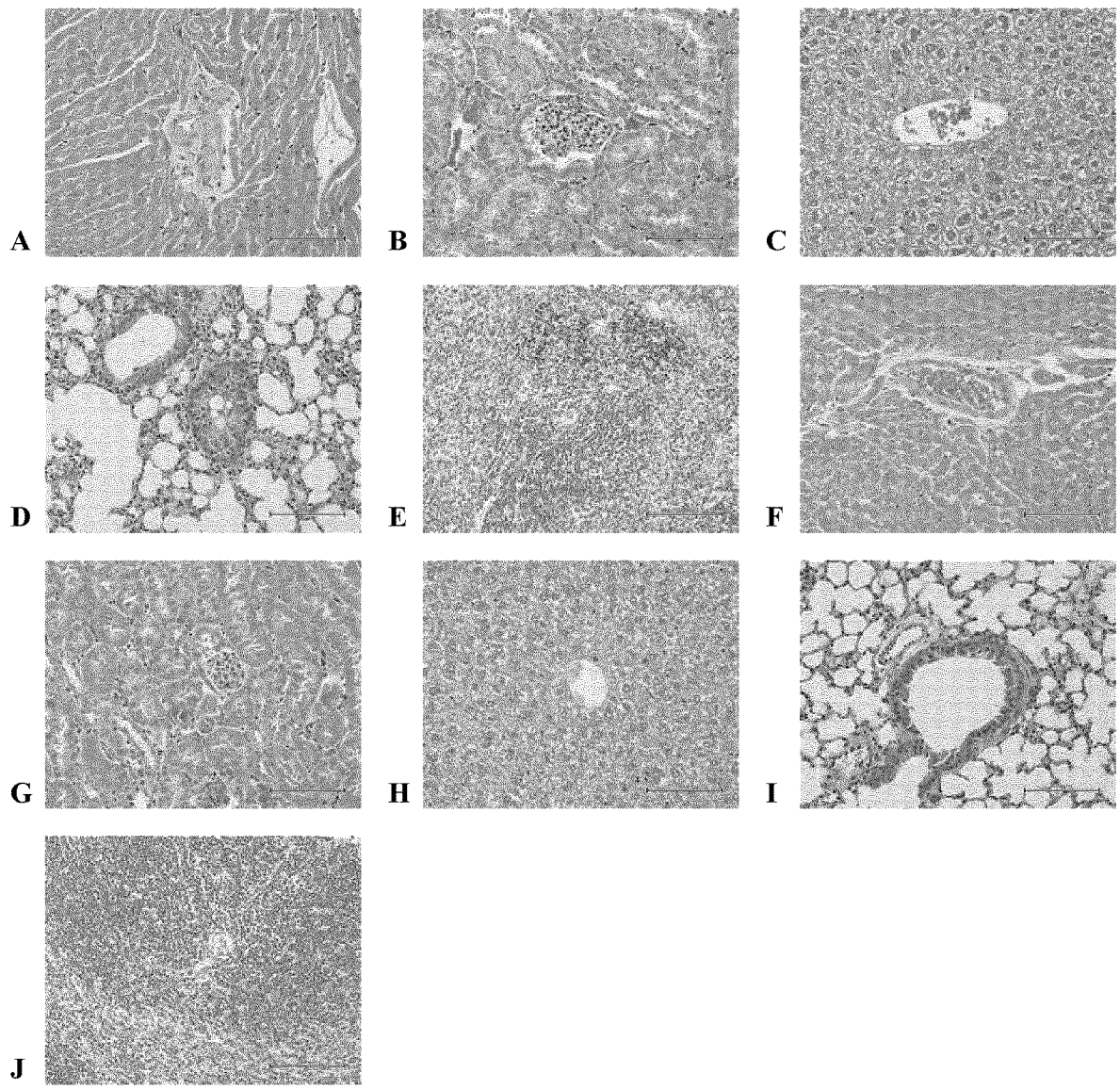
FIG. 7 provides the histopathological findings of the toxicity study for the intravenous injection of the AGO nanoparticles in the ICR mice: including two groups: one treated with 0.25 wt % the AGO nanoparticles and the other treated with 0.5 wt % the AGO nanoparticles; wherein no significant lesions in the heart (A), kidneys(B), liver (c), lungs (D) or spleen (E) were found in the group treated with 0.25 wt % the AGO nanoparticles, and also no significant lesion in the heart (F), kidneys (G), liver (H), lungs (I) or spleen (J) were found in the group treated with 0.5 wt % the AGO nanoparticles (H&E stain. 400×).
Figure 8:
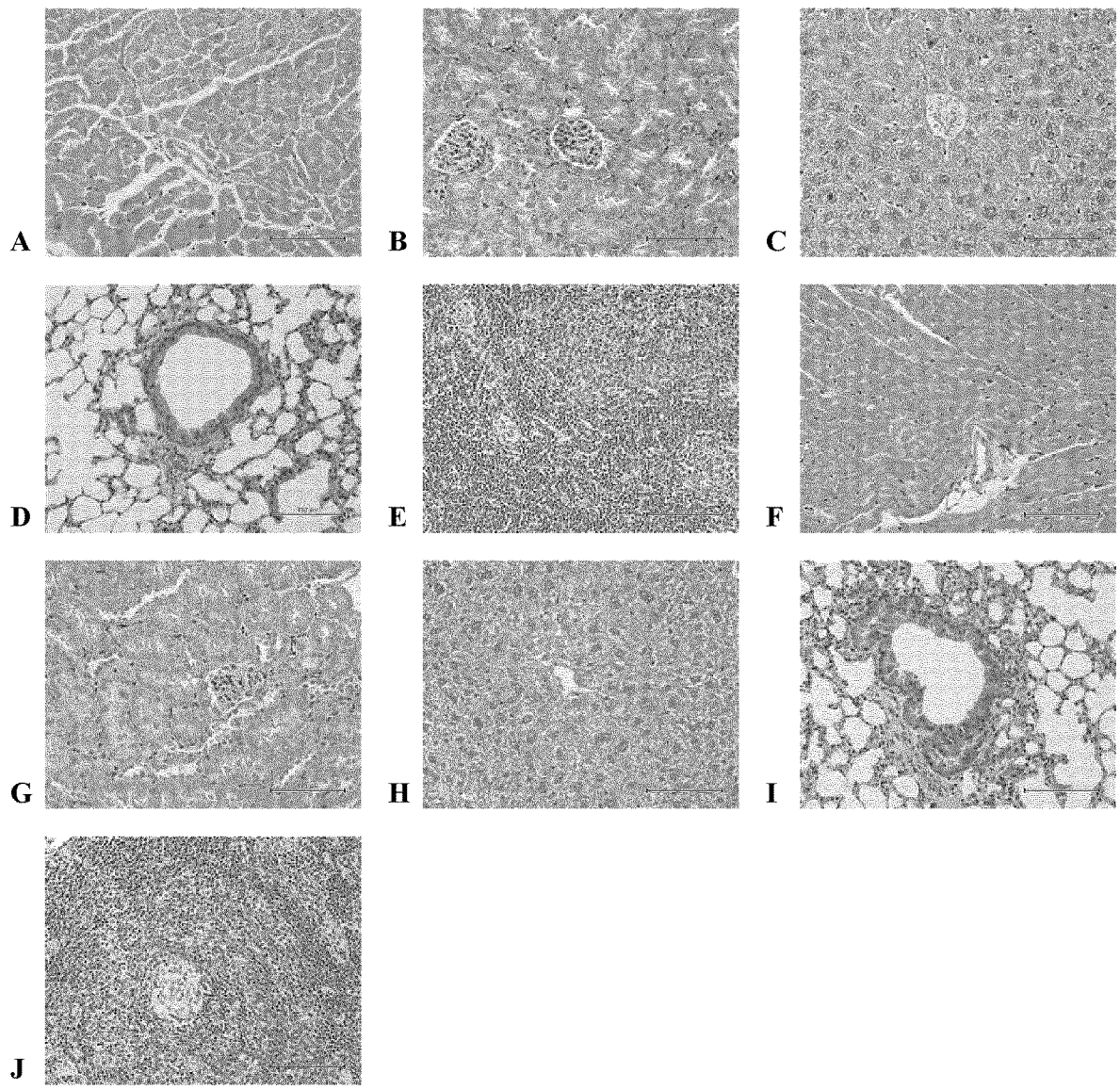
FIG. 8 provides the histopathological findings of the toxicity study for the intravenous Injection of the AGO nanoparticles in the ICR mice, including two groups: one treated with 0.8 wt % the AGO nanoparticles and the other treated with 1.0 wt % the AGO nanoparticles; wherein no significant lesions in the heart (A), kidneys (B), liver (c), lungs (D) or spleen (E) were found in the group treated with 0.8 wt % the AGO nanoparticles and also no significant lesions in in the heart (F), kidneys (G), liver (H), lungs (I)

Each group contained five mice of each sex that were given a single administration of the test animal via tail vein injection (i.v.) routes. All mice were sacrificed on day 14, unless found dead prior to the end of the test period. The heart, kidneys, lungs, liver, and spleen were collected and were submitted for histopathological evaluation. The microscopic examination for those sectioned samples was illustrated in FIGS. 7a and 7b for dose of 0.25%/0.5% groups, and 0.8%/1.0% groups, respectively. Under histopathological evaluation, no significant lesions of the heart, kidneys, liver, lungs, or spleen were found in the AGO nanoparticles at 0.25, 0.5, 0.8, or 1 wt % in aqueous PBS buffer solution administered via intravenous (i.v.) injection in ICR mice. This testing outcomes further confirm the biocompatibility and biosafety in using the AGO nanoparticles in animal and is encouraging a further evaluation toward anti-cancer treatment which will be further reported in coming future.

6. Use of AGO Amphiphilic Macromolecules to Encapsulate Singe Drug

The as-prepared oleic acid-modified sodium alginate (AGO macromolecule), a form of amphiphilic macromolecule was employed to encapsulate hydrophobic drug was disclosed. A highly hydrophobic drug (water-insoluble), curcumin, was prepared by mixing 100 μL (4 mg/mL of curcumin dissolved in DMSO), in 1 mL ddH$_2$O with addition of 0.5 mg AGO powder. The mixture was subjecting to gentle mixing for a time period of 12 hours, forming a clear solution. The final solution was centrifugated at 12,000 rpm for 10 minutes, removed the supernatant. The resulting solid sample was characterized using scanning electronic microscopy to examine the structural morphology of the prepared drug-carrying AGO materials, zeta potential to examine the surface charging of the curcumin-carrying AGO nanoparticle (Table 4), and high-performance liquid chromatography to analyze the encapsulation efficiency of the curcumin in the AGO macromolecule (Table 5). In comparison, we employed another amphiphilic polysaccharide, namely carboxymethyl-hexanoyl chitosan (CHC), as stated in U.S. Pat. No. 8.263,130 B2, to encapsulate curcumin as a comparison (control group). The result was given in Table 2 where the encapsulation efficiency was much lower, 65.2%, as compared with AGO.

It is clear that curcumin can be highly efficiently encapsulated into the AGO nanoparticles and in the meantime, the resulting nanoparticle carrying the drugs possessed a nanometric-size and negatively-charged surface which ensured a colloidal stability for practical use.

TABLE 4

The size and zeta potential of the AGO and curcumin-carrying AGO nanoparticles.

| Sample | Size (nm) | Zeta potential (mV) |
|---|---|---|
| AGO | 329.6 ± 144.8 | −33.45 ± 2.98 |
| AGO/Curcumin | 453.8 ± 111.4 | −18.31 ± 1.52 |

TABLE 5

Curcumin encapsulation efficient in the AGO nanoparticles and carboxymethyl-hexanoyl chitosan (CHC) nanoparticles as comparing group.

| Sample | EE (%) |
|---|---|
| AGO/Curcumin | 96.3 ± 0.2 |
| CHC/Curcumin | 65.2 ± 0.3 |

7. The Use of AGO Amphiphilic Macromolecule to Encapsulate Dual Drug Simultaneously The as-prepared oleic acid-modified sodium alginate (AGO macromolecule), a form of amphiphilic macromolecule was employed to encapsulate hydrophobic drug was disclosed. Two highly hydrophobic drug (water-insoluble), curcumin and paclitaxel, was prepared by mixing 100 μL (4 mg/mL of curcumin and 0.8 mg/mL of paclitaxel, dissolved simultaneously in DMSO), in 1 mL ddH$_2$O with addition of 0.5 mg AGO powder. The mixture was subjecting to gentle mixing for a time period of 12 hours, forming a clear solution. The final solution was centrifugated at 12,000 rpm for 10 minutes, removed the supernatant. The resulting solid sample was characterized using scanning electronic microscopy to examine the structural morphology of the prepared drug-carrying AGO materials, zeta potential to examine the surface charging of the curcumin-carrying AGO nanoparticle (Table 6), and high-performance liquid chromatography to analyze the encapsulation efficiency of the curcumin in the AGO macromolecules (Table 7).

It is clear that both curcumin and paclitaxel can be highly efficiently co-encapsulated into the AGO nanoparticle and in the meantime, the resulting nanoparticles carrying the drug possessed a nanometric-size and negatively-charged surface which ensured a colloidal stability for practical use.

TABLE 6

The size and zeta potential of the AGO and curcumin/paclitaxel dual-drug-carrying AGO nanoparticles.

| Sample | Size (nm) | Zeta potential (mV) |
|---|---|---|
| AGO | 329.6 ± 144.8 | −33.45 ± 2.98 |
| AGO/Paclitaxel-curcumin | 511.5 ± 60.4 | −30.27 ± 1.53 |

TABLE 7

Curcumin and paclitaxel co-encapsulation efficient in the AGO nanoparticles.

| Sample | EE (%) |
|---|---|
| AGO/Curcumin in dual drugs | 82.05 ± 2.3 |
| AGO/Paclitaxel in dual drugs | 63.63 ± 15.19 |

Conclusion

A new type of amphiphilic alginate-based nanoparticles (namely, Alginate-mOA, or AGO) was successfully synthesized with different molecular weights through hydrolysis, following a chemical conjugation with modified oleic acid (mOA). The resulting AGO nanoparticles with different degrees of substitution (DS) were manipulated precisely using the pre-determined ratios of $N_{EDC-HCl}/N_{hexuronic}$ from 0.2, 0.4, 0.6, 0.8 to 1.0, resulting in a DS ranging from 16.4%, 29.6%, 39.4%, 58.8%, to 66.4%, respectively. The AGO nanoparticles showed a self-assembly behavior in aqueous solution resulting in a sphere-like nanoparticle with an average size of 300-500 nm in diameter. Critical micellar concentration (CMC) of the AGO was determined and the lowest CMC of 0.008% can be achieved, which encouraged the structural stability of the AGO nanoparticles in medical use, especially in blood circulation. The colloidal stability of AGO nanoparticles in aqueous solution was further evidenced by its strong negatively-charged potential of AGO nanoparticles with various degree of substitution. Biocompatibility of the AGO was evaluated using two types of cancerous cells and one normal cell, and followed by an in-vivo study, all showed excellent cytocompatibility and biosafety as well. This work clearly demonstrated a successful design and synthesis of new type of self-assemble, structurally stable, and biocompatible alginate-based AGO nanoparticles, and its lowest molecular weight ensures a potential use in biomedical field, such as drug delivery application, where a subsequent metabolization via renal clearance is expected to be exercised when it allows to be clinically translated.

Furthermore, the oleic acid-modified sodium alginate (AGO) disclosed in this invention ensures its great drug encapsulation capability toward single or multiple drugs of water-insoluble property. Experimental observations also substantiated it's beneficial to (1) reduce cytotoxicity possibly exerted from those highly-potent pharmaceutic ingredients for anti-cancer, anti-proliferation, and anti-inflammation, etc. purposes. (2) enhance water solubility of those highly-water-insoluble drugs to enhance their bioavailability upon therapy, (3) synergize therapeutic performance while dual-drug co-administration was carried out to treat difficult-to-cure diseases such as metastasized solid tumors, etc. (4) form stable colloidal dosage over short-to-long term storage period for clinical uses as demanded, and (5) give potential versatility for a subsequent novel dosage form for specific delivery.

While this specification contains many specifics, these should not be construed as limitations on the scope of the invention or of what may be claimed, but rather as descriptions of features specific to particular embodiments or examples of the invention. Certain features that are described in this specification in the context of separate embodiments or examples can also be implemented in combination in a single embodiment.

What is claimed is:

1. An alginate-oleic acid (AGO) macromolecule, which is comprised of alginate and oleic acid linked with a spacer,
    wherein the AGO macromolecule has a molecular weight ranging from 23,000 to 35,000 g/mole;
    wherein a degree of substitution of the AGO macromolecule is in a range of 16.4% to 66.4%; and
    wherein the AGO macromolecule has a structure of Formula I and a structure of Formula II:

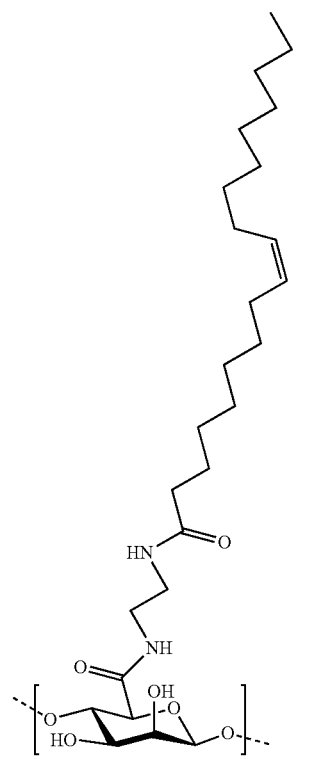

Formula I

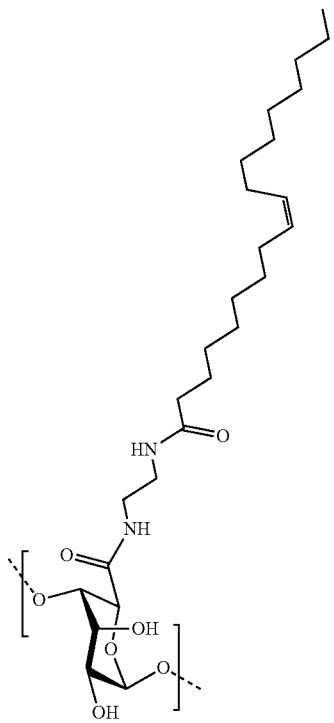

Formula II

2. An AGO nanoparticle, which is formed by self-assembly of the AGO macromolecule set forth in claim 1.

3. The AGO nanoparticle of claim 2, which encapsulates an active agent for delivery.

4. The AGO nanoparticle of claim 3, in which the active agent is a drug or a biological agent.

5. The AGO nanoparticle of claim 4, in which the biological agent is a peptide, a protein, an antibody, a serum product, or a vaccine.

6. The AGO nanoparticle of claim 5, in which the biological material is a plurality of cells or stem cells.

7. The AGO nanoparticle of claim 2, into which single, dual or multiple active agents are encapsulated.

8. A dual-drug nanoparticle, comprising two active agents encapsulated into the AGO nanoparticle set forth in claim 1.

9. A multiple-drug nanoparticle, comprising more than two active agents encapsulated into the AGO nanoparticle set forth in claim 1.

10. A process for preparing the AGO macromolecules of claim 1, which comprises the steps of
   (1) mixing oleic acid (OA) and N-(3-dimethylaminopropyl)-N'-ethylcarbodiimide hydrochloride (EDC-HCl) in dichloromethane (DCM), and then mixing it with ethylenediamine in DCM to obtain a mixture;
   (2) reacting the mixture with brine to obtain a product, extracting the aqueous phase of the product with DCM, collecting the organic phase of the product, and drying the product;
   (3) concentrating the product under reduced pressure to obtain a crude modified OA (mOA), and removing residual OA to obtain an mOA;
   (4) dissolving sodium alginate in water to obtain a solution, adjusting the pH of the solution to pH 3~4, and adding an aqueous solution of EDC-HCl while maintaining the pH at a pH of pH 3~4;
   (5) adding the mOA to the solution for reaction; and
   dialyzing the resulting solution against distilled water, and lyophilizing the dialyzed solution to obtain the AGO macromolecule.

11. The process of claim 10, wherein in step (5) the reaction is performed by stirring at 35° C. for 24 hours.

* * * * *